US012300454B2

(12) United States Patent
Kim

(10) Patent No.: US 12,300,454 B2
(45) Date of Patent: May 13, 2025

(54) CIRCUIT BREAKER HAVING MAIN CIRCUIT UNIT COVER

(71) Applicant: LS ELECTRIC CO., LTD., Anyang-si (KR)

(72) Inventor: Byoungchul Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 153 days.

(21) Appl. No.: 18/020,553

(22) PCT Filed: Mar. 10, 2021

(86) PCT No.: PCT/KR2021/002953
§ 371 (c)(1),
(2) Date: Feb. 9, 2023

(87) PCT Pub. No.: WO2022/035009
PCT Pub. Date: Feb. 17, 2022

(65) Prior Publication Data

US 2023/0298841 A1 Sep. 21, 2023

(30) Foreign Application Priority Data

Aug. 11, 2020 (KR) ........................ 10-2020-0100669

(51) Int. Cl.
*H01H 71/02* (2006.01)
*H01H 33/666* (2006.01)
*H01H 71/08* (2006.01)

(52) U.S. Cl.
CPC ...... *H01H 71/0264* (2013.01); *H01H 33/666* (2013.01); *H01H 71/0214* (2013.01); *H01H 71/08* (2013.01)

(58) Field of Classification Search
CPC .............. H02B 13/035; H02B 13/0352; H02B 13/0354; H02B 13/0358; H02B 13/045; H01H 33/00; H01H 33/02; H01H 33/08; H01H 33/666; H01H 9/12; H01H 71/02; H01H 71/08; H01H 71/0264;
(Continued)

(56) References Cited

FOREIGN PATENT DOCUMENTS

| | | | |
|---|---|---|---|
| JP | 2000333321 | A | 11/2000 |
| KR | 2019990034268 | U | 8/1999 |

(Continued)

OTHER PUBLICATIONS

International Search Report for related International Application No. PCT/KR2021/002953; action dated Feb. 17, 2022; (5 pages).

(Continued)

*Primary Examiner* — Anthony R Jimenez
(74) *Attorney, Agent, or Firm* — K&L Gates LLP

(57) ABSTRACT

The present disclosure relates to a circuit breaker having a main circuit unit cover and, more particularly, to a circuit breaker having a removable main circuit unit cover so as to be applicable to a change in rated capacity. A circuit breaker according to one embodiment of the present disclosure comprises: a main circuit unit connected to a power source and a load; a main circuit unit cover which insulatively covers the rear surface of the main circuit unit; a main circuit unit terminal connected to the main circuit unit and exposed to the outside through the main circuit unit cover; and a terminal protection member detachably coupled to the main circuit unit cover and insulatively covering the main circuit unit terminal.

11 Claims, 11 Drawing Sheets

(58) Field of Classification Search
CPC ........... H01H 71/0214; H01H 2071/00; H01H 45/00; H01H 45/02; H01H 73/00; H01H 73/06; H01H 9/00; H01H 9/02; H01H 9/0264
See application file for complete search history.

(56) References Cited

FOREIGN PATENT DOCUMENTS

| | | | |
|---|---|---|---|
| KR | 2020000005351 | U | 3/2000 |
| KR | 101752301 | B1 | 6/2017 |
| KR | 20180058552 | A | 6/2018 |

OTHER PUBLICATIONS

Written Opinion for related International Application No. PCT/KR2021/002953; action dated Feb. 17, 2022; (4 pages).
Notice of Allowance for related Korean Application No. 10-2020-0100669; action dated Nov. 3, 2022; (2 pages).
Office Action for related Korean Application No. 10-2020-0100669; action dated May 28, 2022; (4 pages).

CIRCUIT BREAKER HAVING MAIN CIRCUIT UNIT COVER

CROSS-REFERENCE TO RELATED APPLICATIONS

This application is the National Stage filing under 35 U.S.C. 371 of International Application No. PCT/KR2021/002953, filed on Mar. 10, 2021, which claims the benefit of earlier filing date and right of priority to Korea utility model Application No. 10-2020-0100669 filed on Aug. 11, 2020, the contents of which are all hereby incorporated by reference herein in their entirety.

FIELD

The present disclosure relates to a circuit breaker having a main circuit unit cover, and more particularly, to a circuit breaker having a detachable main circuit unit cover so as to be applicable to a change in rated capacity.

BACKGROUND

In general, a circuit breaker is a power device installed in a portion of a power system to protect the power system and a load by breaking a circuit when an overcurrent or a fault current occurs.

Among other circuit breakers, especially, a vacuum circuit breaker is a product that protects human lives and load equipment by breaking a circuit in a vacuum extinguishing manner using a vacuum interrupter (VI) disposed in the circuit breaker by an external relay when fault currents, such as overcurrents, short-circuit, ground faults, occur in extra-high/high-voltage distribution lines.

This vacuum circuit breaker is typically installed in a switchboard in which various power devices are received and managed for operations or controls of power plants and substations, the operations of motors. Specifically, a breaker main body is generally received and installed at a cradle or truck inside a compartment that is defined in the switchboard.

FIGS. 1 to 3 illustrate a switchboard according to the related art. FIG. 1 is a perspective view of the related art switchboard.

The switchboard 1 allows voltage or current to flow therealong while accommodating various power devices therein, and detects a fault state when a fault voltage or current occurs, so as to break a circuit breaker or provide information to another control device.

In the switchboard 1, a plurality of compartments are defined to accommodate such power devices according to the purpose of use, and each compartment has shielding and insulating performances prescribed by laws and regulations.

The compartments of the switchboard 1 may include a circuit breaker compartment 2 where a circuit breaker is accommodated, a bus bar compartment 3 through which bus bars and cables pass, a transformer compartment 4 where a potential transformer is accommodated, and a low-voltage device compartment 5 where low-voltage devices are accommodated.

At this time, it is common that frames or plates constituting each compartment, electric devices or internal parts inside the compartment are coupled to each other by bolts.

FIGS. 2 and 3 are lateral views of the circuit breaker compartment 2, wherein FIG. 2 illustrates a state in which a circuit breaker 6 is located at a test position, and FIG. 3 illustrates a state in which the circuit breaker is in a service position. When the vacuum circuit breaker is installed in the switchboard breaker compartment (CB compartment), an initial position where it is not connected to the bus bar of the bus bar compartment is referred to as a test position (FIG. 2), and a position where it is connected to the bus bar is referred to as a service position (FIG. 3).

The circuit breaker 6 is accommodated in the circuit breaker compartment 2. The circuit breaker 6 includes a main circuit unit 7 and an opening/closing mechanism 8, and main circuit unit terminals 9 are connected to the main circuit unit 7. A contactor 13 is disposed on each main circuit unit terminal 9.

An insulation bushing 10 is provided on a rear surface of the circuit breaker compartment 2 to protect the main circuit unit terminal 9 and a bus bar (not illustrated) and improve insulating performance. The main circuit unit terminal 9 is inserted into the insulation bushing 10 and connected to the bus bar (not illustrated) at the service position of the circuit breaker 6 (see FIG. 3).

FIG. 4 is an exploded perspective view, viewed from the rear of the circuit breaker.

The main circuit unit 7 of the circuit breaker 6 is provided with a vacuum interrupter 14 having a fixed contact and a movable contact. Since a high voltage flows in the main circuit unit 7, a main circuit cover 11 that covers the rear surface of the main circuit unit 7 is provided in order to prevent safety accidents and improve insulation.

When the vacuum circuit breaker is located at the service position, as illustrated in FIG. 3, the main circuit cover 11 is required to protect the insulation between a main circuit of the vacuum circuit breaker and the rear surface of the enclosure circuit breaker compartment 2 at the service position.

The main circuit cover is an important component for providing a stable insulation level to be endurable, without insulation breakdown, from various high voltages such as a power frequency withstand voltage, a lightning impulse voltage, a switching surge, etc. between adjacent phases of the vacuum circuit breaker including three phases and between an electrical connection part and an enclosure.

On the other hand, when a rated voltage is high or a size of the circuit breaker 6 is large, the main circuit unit terminal 9 also elongates, so it is necessary to prevent insulation breakdown of the main circuit unit terminal 9. Therefore, an insulation tube 12 for protecting each main circuit unit terminal 9 protrudes from the main circuit cover 11.

In the related art, when the insulation tube is formed on the main circuit cover, as illustrated in FIG. 4, a mold becomes large, in which causes an increase in a cost for manufacturing the mold and a material cost. In addition, when a rated voltage is changed, the entire main circuit cover must be replaced, thereby further increasing the costs.

SUMMARY

The present disclosure has been devised to solve those problems and other drawbacks, and one aspect of the present disclosure is to provide a circuit breaker having a main circuit unit cover that is compatible for various rated voltages.

A circuit breaker according to one embodiment of the present disclosure may include a main circuit unit connected to each of a power source and a load, a main circuit unit cover insulatively covering a rear surface of the main circuit unit, a main circuit unit terminal connected to the main circuit unit and exposed to outside through the main circuit unit cover, and a terminal protection member detachably coupled to the main circuit unit cover and insulatively covering the main circuit unit terminal.

Here, the main circuit unit cover may be provided with a through hole through which the main circuit unit terminal is to be inserted.

The main circuit unit cover may be provided with a protection portion formed in a tubular shape around the through hole.

The through hole may be formed in a circular or polygonal shape, and the protection portion is formed in a shape of a circular tube or polygonal tube corresponding to the shape of the through hole.

The protection portion may be provided with a plurality of mounting protrusions or mounting grooves.

The terminal protection member may be formed in a tubular shape with two steps including a first end portion and a second end portion stepped from each other.

The terminal protection member may be formed such that a width of the second end portion is smaller than a width of the first end portion and a circumference of the second end portion is smaller than a circumference of the first end portion.

A length of the second end portion may be longer than a length of the first end portion.

A plurality of mounting plates coupled to the protection portion may be disposed inside the first end portion.

Each of the mounting plates may be provided with fitting grooves or fitting protrusions coupled to the mounting protrusions or mounting grooves.

Each of the mounting plates may be fixed only on a fixed end portion thereof, which comes in contact with a connection surface connecting the first end portion and the second end portion.

The protection portion may be inserted into a space defined between a surface of the first end portion and surfaces of the mounting plates.

The second end portion may be asymmetrically disposed with respect to the first end portion.

In a circuit breaker according to one embodiment of the present disclosure, a terminal protection member is separately provided to be detachably coupled to a main circuit unit cover, which can facilitate an assembly process.

Compatibility according to a change in rated voltage can also be enhanced.

In addition, a manufacturing cost can be reduced.

BRIEF DESCRIPTION OF THE DRAWINGS

FIGS. 2 and 3 are lateral views of a circuit breaker compartment according to the related art, wherein FIG. 2 illustrates a state in which a circuit breaker is located at a test position, and FIG. 3 illustrates a state in which the circuit breaker is located at a service position.

DETAILED DESCRIPTION

Hereinafter, preferred embodiments of the present disclosure will be described with reference to the accompanying drawings, so that a person skilled in the art can easily carry out the disclosure. It should be understood that the technical idea and scope of the present disclosure are not limited to those preferred embodiments.

Figure 5:
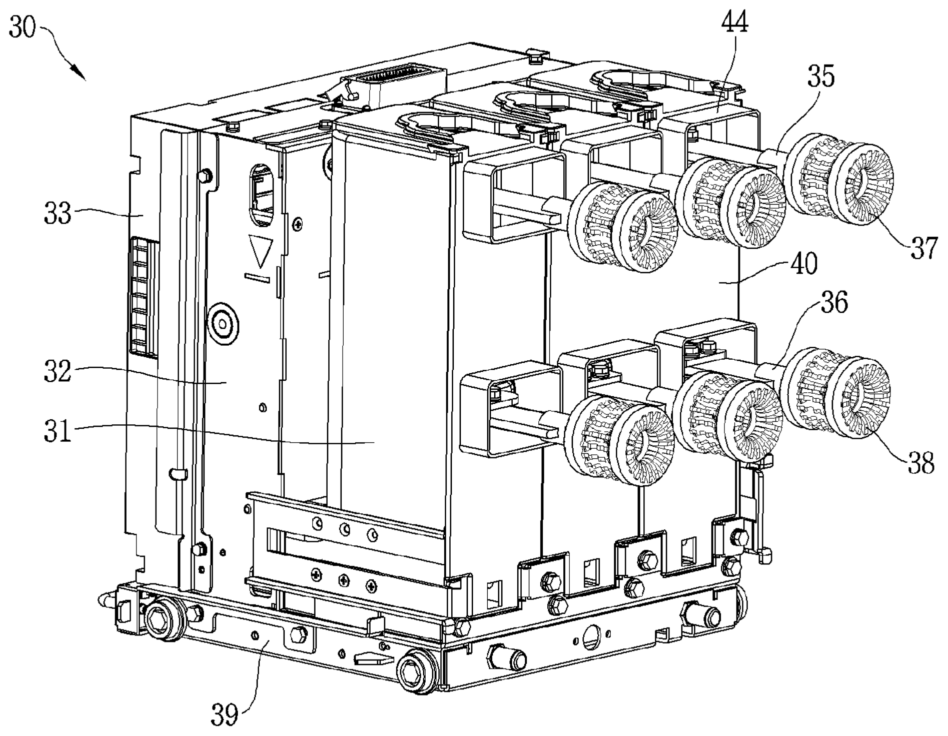
FIGS. 5 and 6 are a rear perspective view and an exploded perspective view each illustrating a circuit breaker in accordance with one embodiment of the present disclosure. This shows a state that a terminal protection member is removed from a main circuit unit cover.
Figure 6:
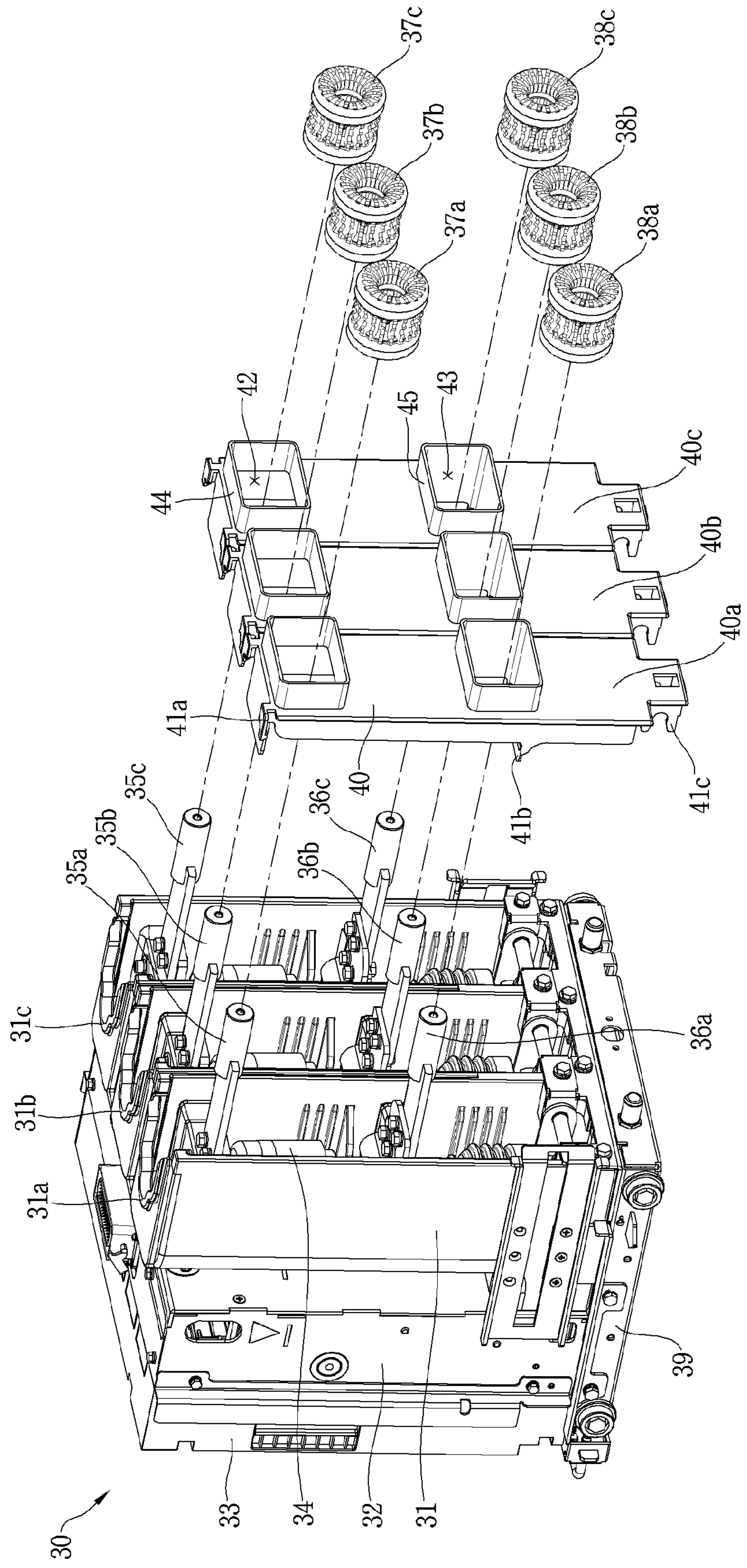
Figure 7:
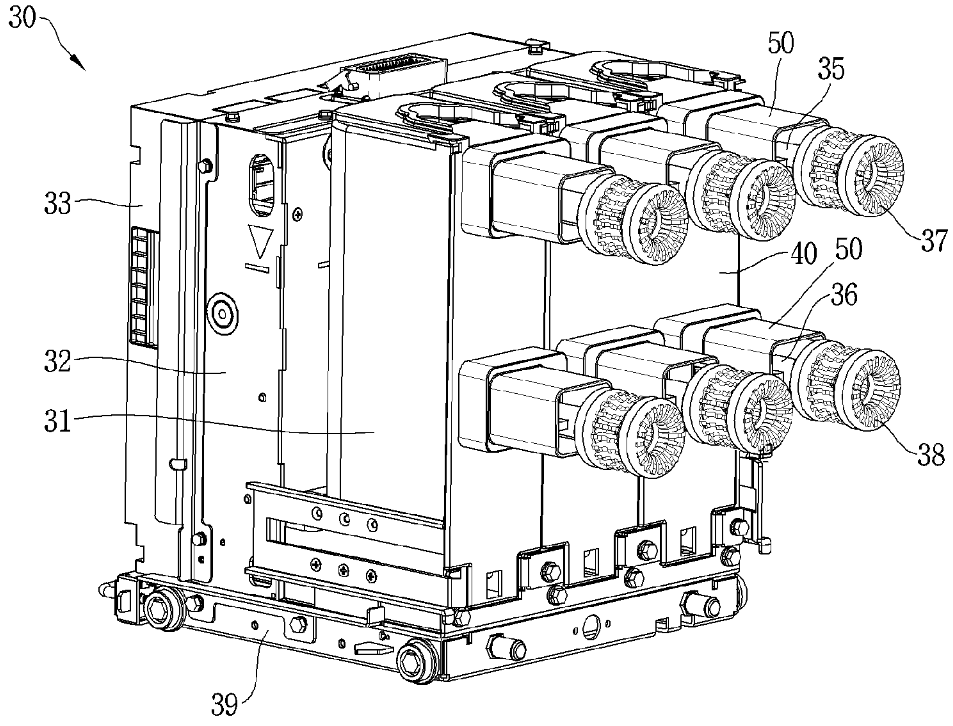
FIGS. 7 and 8 are a rear perspective view and an exploded perspective views each illustrating a state in which the terminal protection member is coupled to the main circuit unit cover in FIGS. 5 and 6.
Figure 8:
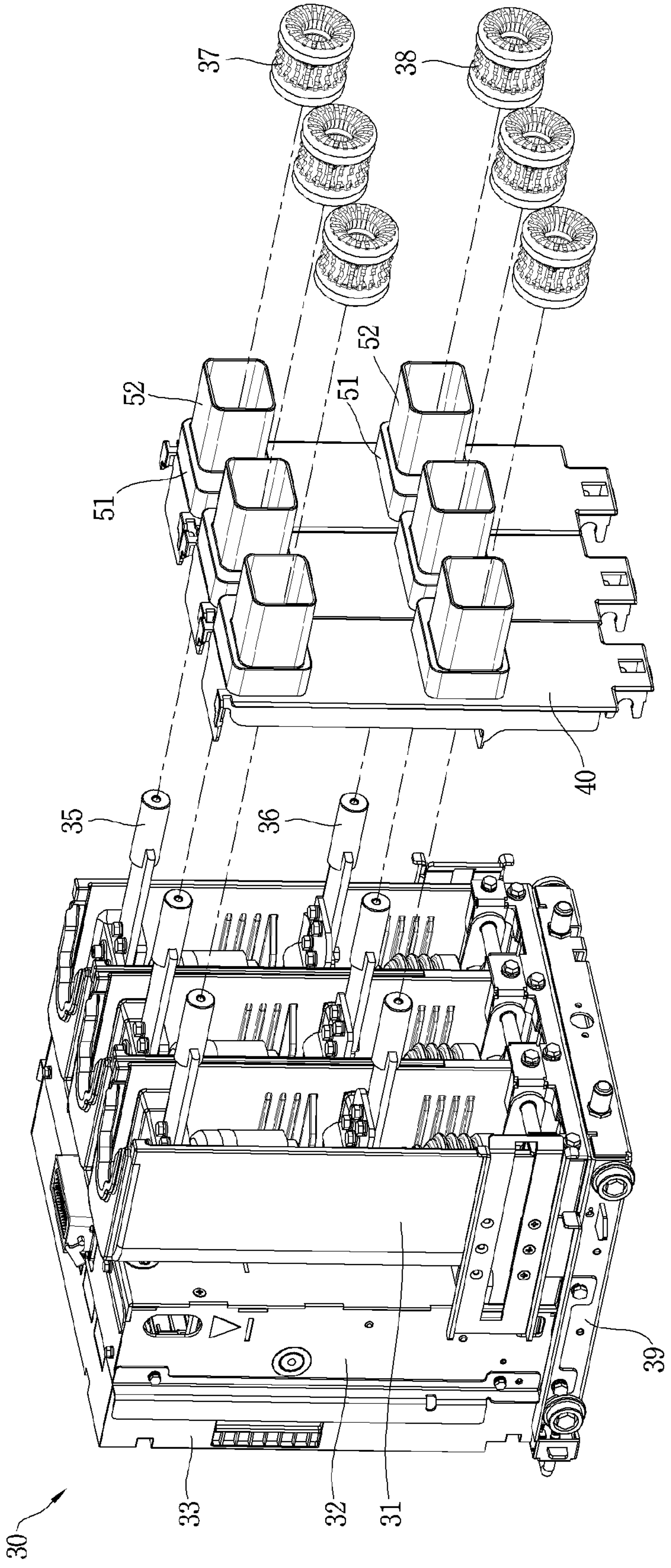
Figure 9:
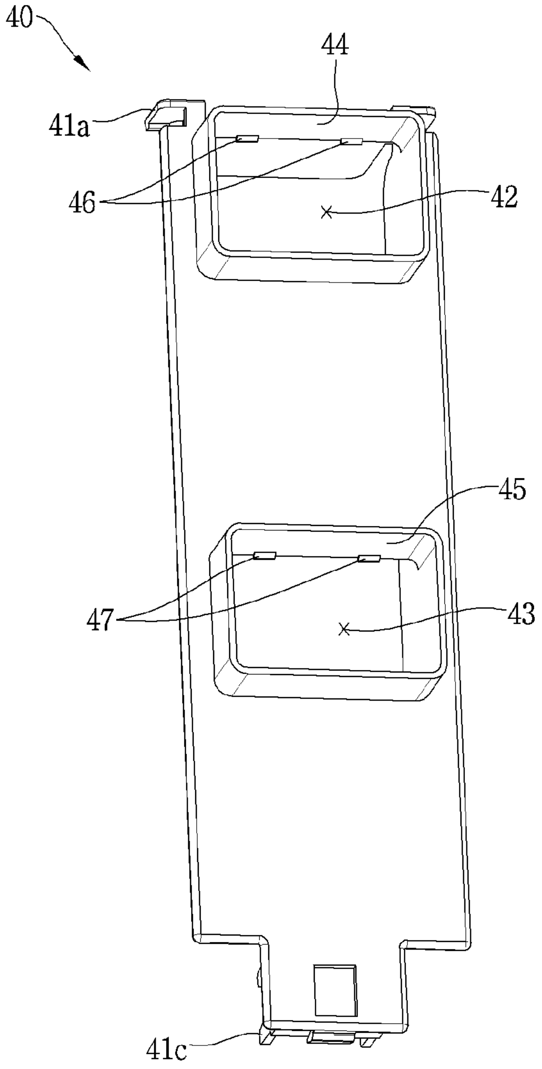
FIG. 9 is a perspective view illustrating a main circuit unit cover applied to a circuit breaker in accordance with one embodiment of the present disclosure.
Figure 10:
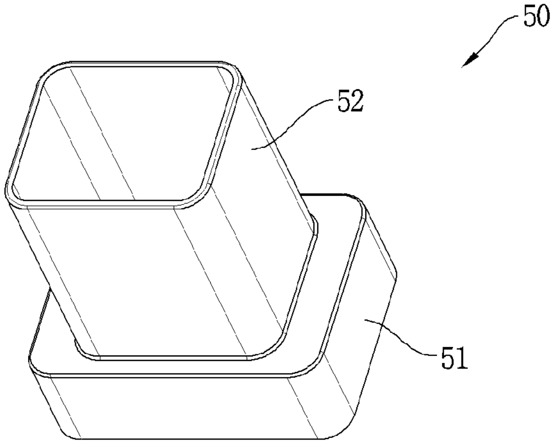
FIGS. 10 and 11 are perspective views illustrating a terminal protection member applied to a circuit breaker in accordance with one embodiment.
Figure 11:
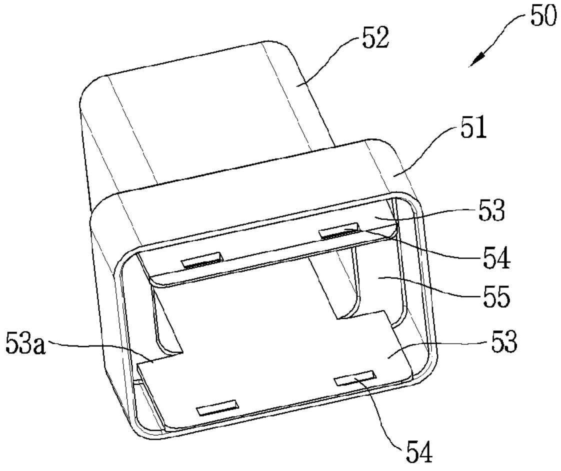

FIGS. 5 to 8 are rear perspective views and exploded perspective views each illustrating a circuit breaker in accordance with one embodiment of the present disclosure. FIGS. 5 and 6 are a rear perspective view and an exploded perspective view each illustrating a state in which a terminal protection member is removed from a main circuit unit cover, and FIGS. 7 and 8 are a rear perspective view and an exploded perspective view each illustrating a state in which the terminal protection member is coupled to the main circuit unit cover. FIG. 9 is a perspective view illustrating the main circuit unit cover applied to the circuit breaker in accordance with the one embodiment of the present disclosure, and FIGS. 10 and 11 are perspective views illustrating the terminal protection member applied to the circuit breaker in accordance with the one embodiment. Hereinafter, the circuit breaker in accordance with the embodiment of the present disclosure will be described in detail with reference to the accompanying drawings.

A circuit breaker having a main circuit unit cover according to an embodiment of the present disclosure includes a main circuit unit 31 connected to each of a power source and a load, a main circuit unit cover 40 covering a rear surface of the main circuit unit 31 in an insulating manner, a main circuit unit terminal 35 connected to the main circuit unit 31 and exposed to outside through the main circuit unit cover 40, and a terminal protection member 50 detachably coupled to the main circuit unit cover 40 and covering the main circuit unit terminal 35 in an insulating manner.

The circuit breaker 30 is drawn in and out while being loaded on a truck 39 (or cradle).

The circuit breaker 30 includes a main circuit unit 31, an opening and closing mechanism 32, and a manipulation unit 33. In the case of a vacuum circuit breaker, a vacuum interrupter having a fixed contact and a movable contact is disposed in the main circuit unit 31.

In the main circuit unit 31, main circuit unit terminals 35 and 36 are connected to both ends (of a vacuum interrupter), respectively. The main circuit unit terminals 35 and 36 include a first terminal 35 connected to a power source or a primary side and a second terminal 36 connected to a load or a secondary side. Since the first terminal 35 is connected to an upper portion of the main circuit unit 31, it is referred to as an upper terminal, and since the second terminal 36 is connected to a lower portion of the main circuit part 31, it is also referred to as a lower terminal.

The main circuit unit 31 is generally configured to have three phases. That is, the main circuit unit 31 has three phases of R phase, S phase, and T phase. For convenience, those phases are distinguished as a first phase, a second phase, and a third phase. The distinguishment of each phase uses subscripts a, b, and c. That is, those three phases are expressed as a first-phase main circuit unit 31*a*, a second-phase main circuit unit 31*b*, and a third-phase main circuit unit 31*c*. (In this specification, subscripts a, b, and c are added to the reference numerals when distinguishment for each phase is required.)

A vacuum interrupter 34 is also provided for each main circuit unit 31. That is, the vacuum interrupter 34 is also provided for each phase.

The main circuit unit terminals 35 and 36 are also provided for each phase. Therefore, when it is necessary to distinguish the main circuit unit terminals 35 and 36 for each phase, the subscripts a, b, and c are used. That is, the first terminal 35 includes a first-phase first terminal 35*a*, a second-phase first terminal 35*b*, and a third-phase first terminal 35*c*, and the second terminal 36 includes a first-phase second terminal 36*a*, a second-phase second terminal 36*b*, and a third-phase second terminal 36*c*.

Contactors 37 and 38 are provided on end portions of the main circuit unit terminals 35 and 36, respectively. In the case of a high-voltage circuit breaker, the contactors 37 and 38 may be configured as tulip contactors. The contactors 37 and 38 include a first contactor 37 coupled to the first terminal 35 and a second contactor 38 coupled to the second terminal 36.

The contactors 37 and 38 are also provided for each phase. Therefore, when it is necessary to distinguish the contactors 37 and 38 for each phase, the subscripts a, b, and c are used. That is, the first contactor 37 includes a first-phase first contactor 37*a*, a second-phase first contactor 37*b*, and a third-phase first contactor 37*c*, and the second contactor 38 includes a first-phase second contactor 38*a*, a second-phase second contactor 38*b*, and a third-phase second contactor 38*c*.

Figure 1:
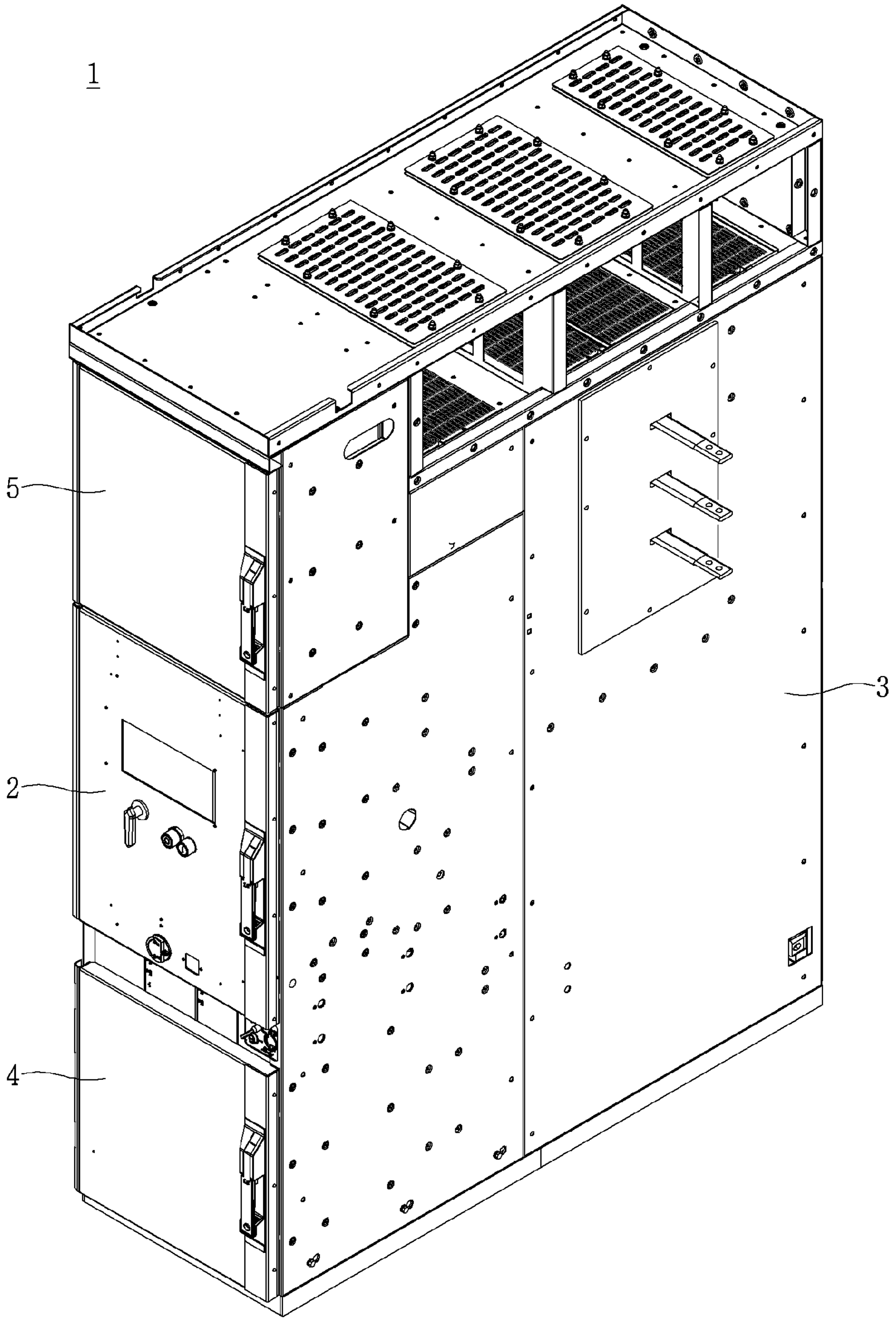
FIG. 1 is a perspective view of the related art switchboard.
Figure 2:
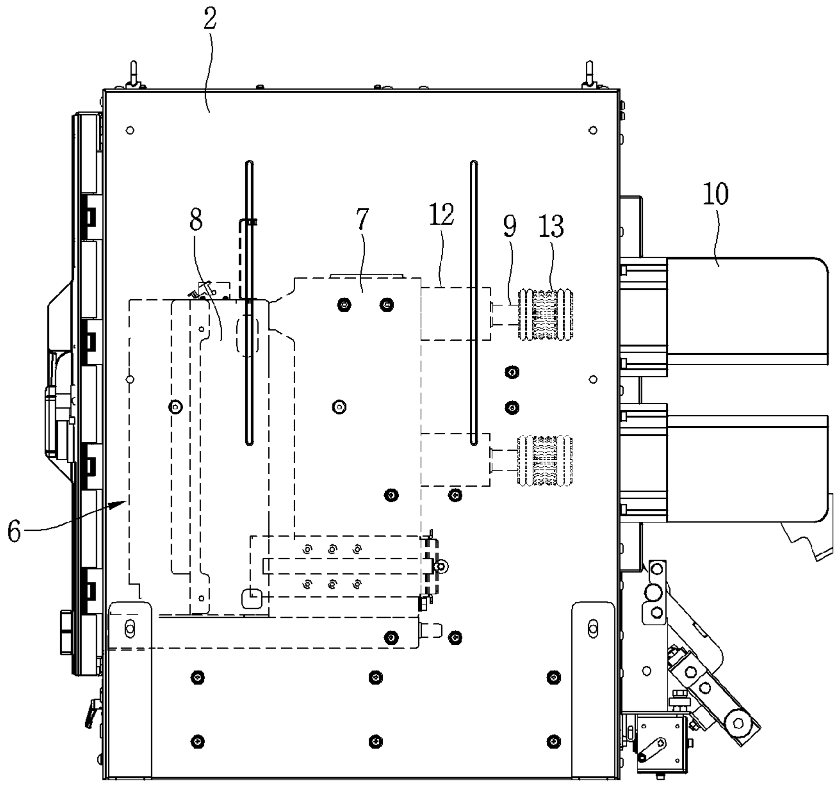
Figure 3:
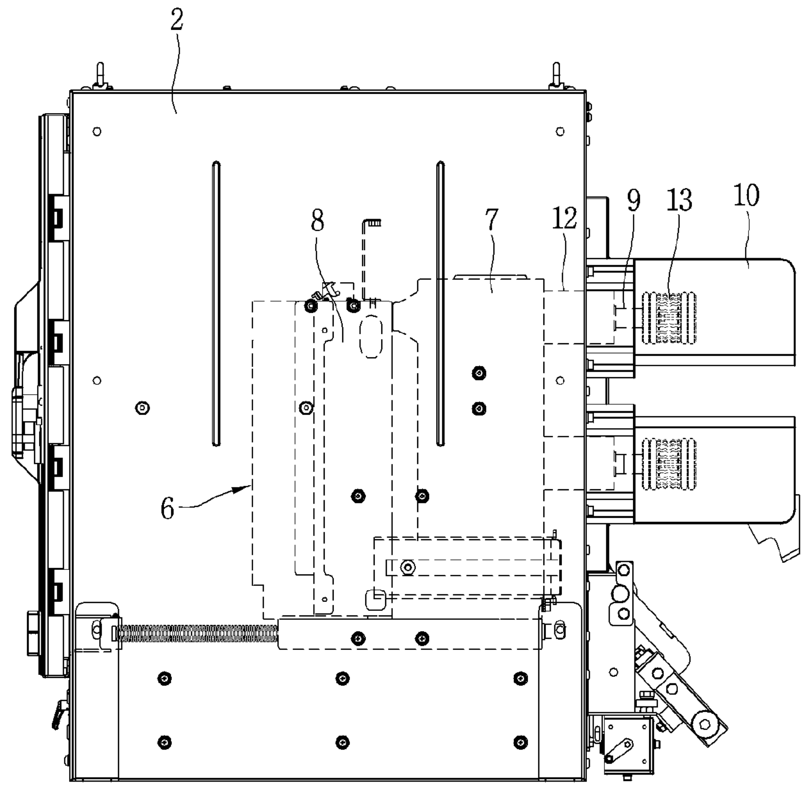
Figure 4:
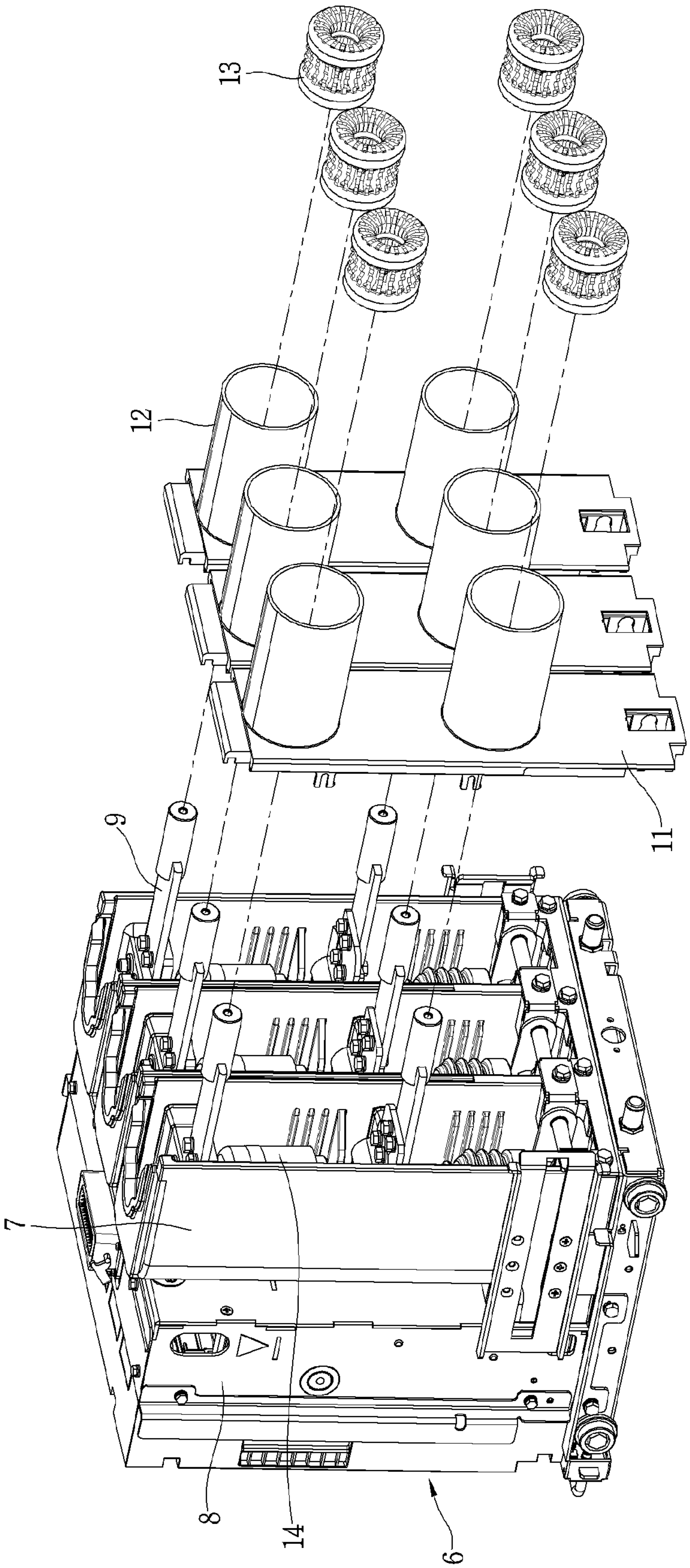
FIG. 4 is an exploded perspective view illustrating a rear surface of the circuit breaker according to the related art.

The main circuit unit cover 40 is provided on the main circuit unit 31 of the circuit breaker 30. The main circuit unit cover 40 is formed of an insulating material. The main circuit unit cover 40 is coupled to a rear surface of the main circuit unit 31. The main circuit unit cover 40 blocks the rear surface of the main circuit unit 31 to prevent penetration of foreign substances. In addition, the main circuit unit cover 40 is formed of an insulating material to ensure insulation of the main circuit unit terminals 35 and 36. That is, an insulation distance and creepage distance necessary for a three-phase circuit are secured. In addition, the insulation between the circuit breaker 30 and the circuit breaker compartment (see FIG. 2) is improved.

Since the main circuit unit cover 40 is provided for each phase, subscripts a, b, and c are used when it is necessary to distinguish each phase. That is, the main circuit unit cover 40 includes a first-phase main circuit unit cover 40*a*, a second-phase main circuit unit cover 40*b*, and a third-phase main circuit unit cover 40*c*.

Coupling portions 41*a*, 41*b*, and 41*c* are provided for coupling the main circuit unit cover 40 to the main circuit unit 31. The coupling portions 41*a*, 41*b*, and 41*c* include an upper coupling portion 41*a* formed on an upper end of the main circuit unit cover 40, an intermediate coupling portion 41*b* formed on a middle portion of the main circuit unit cover 40, and a lower coupling portion 41*c* formed on a lower end of the main circuit unit cover 40. The coupling portions 41*a*, 41*b*, and 41*c* protrude in the form of protrusions and may be fitted into the main circuit unit 31.

The main circuit unit cover 40 is provided with through holes 42 and 43 into which the main circuit unit terminals 35 and 36 can be inserted, respectively. A first through hole 42 is located at a position where the first terminal 35 is disposed, and the second through hole 43 is located at a position where the second terminal 36 is disposed.

The main circuit unit cover 40 is provided with protection portions 44 and 45 disposed around the through holes 42 and 43. The protection portions 44 and 45 may be formed in a tube shape. The protection portions 44 and 45 are made of an insulating material to protect the main circuit unit terminals 35 and 36 and improve insulation performance. In addition, the protection portions 44 and 45 serve as mounting portions to which terminal protection members 50 can be mounted.

A first protection portion 44 is disposed around the first through hole 42, and a second protection portion 45 is disposed around the second through hole 43. The protection portions 44 and 45 are also provided for each phase. Therefore, when it is necessary to distinguish the protection portions 44 and 45 for each phase, the subscripts a, b, and c are used.

Here, the through holes 42 and 43 may be formed in a polygonal shape such as a circle, a square, and an octagon, and the protection portions 44 and 45 may be formed in a polygonal tubular shape such as a circular tube, a square tube, and an octagonal tube to correspond to the through holes 42 and 43.

A plurality of mounting protrusions 46 and 47 or mounting grooves are formed at the protection portions 44 and 45, respectively. The mounting protrusions 46 and 47 or mounting grooves may be formed on or in inner surfaces of the protection portions 44 and 45, respectively. First mounting protrusions 46 are formed on the first protection portion 44, and second mounting protrusions 47 are formed on the second protection portion 45.

Terminal protection members 50 are provided. The terminal protection members 50 are coupled to the protection portions 44 and 45, respectively, to improve insulation of the main circuit unit terminals 35 and 36 and protect the main circuit unit terminals 35 and 36 from the outside. The terminal protection members 50 are formed of an insulating material.

The terminal protection member 50 is also provided for each phase. Therefore, when it is necessary to distinguish the terminal protection member 50 for each phase, the subscripts a, b, and c are used. That is, the terminal protection member 50 includes a first-phase terminal protection member 50*a*, a second-phase terminal protection member 50*b*, and a third-phase terminal protection member 50*c*.

The terminal protection member 50 is formed in a tubular shape formed in two steps. That is, the terminal protection member 50 includes a first end portion 51 and a second end portion 52 formed to be stepped from the first end portion 51. Distinguishing the terminal protection member 50 for each phase, the terminal protection member 50 includes a first-phase first end portion 51*a*, a first-phase second end portion 52*a*, a second-phase first end portion 51*b*, a second-phase second end portion 52*b*, a third-phase first end portion 51*c*, and a third-phase second end portion 52*c*.

The second end portion 52 is formed to have a smaller size than the first end portion 51. That is, a width or circumference of the second end portion 52 is smaller than a width or circumference of the first end portion 51. However, a length of the second end portion 52 is longer than that of the first end portion 51. The second end portion 52 may be long enough to cover most of the main circuit unit terminal 35, 36.

A plurality of mounting plates 53 are disposed inside the first end portion 51. The mounting plate 53 may be formed at upper and lower sides inside the first end portion 51 (i.e., both sides in the first end portion 51), respectively.

Each of the mounting plates 53 is fixed only on one side surface thereof. This one side surface is referred to as a fixed end portion 53*a*. The mounting plate 53 may be fixed to a connection surface 55 where the first end portion 51 and the second end portion 52 meet with each other. That is, the fixed end portion 53*a* is a portion in contact with the connection surface 55. Accordingly, since only the fixed end portion 53*a* of the mounting plate 53 is fixed and a remaining portion is free, such a free end portion (an opposite end portion to the fixed end portion) has elasticity to be shaken based on the fixed end portion 53*a*. This provides flexibility when coupling the terminal protection member 50 and facilitates attachment or detachment of the terminal protection member 50.

Each of the mounting plates 53 is provided with fitting protrusions into which the mounting protrusions 46, 47 are fitted or fitting protrusions corresponding to the mounting grooves. Accordingly, the mounting plate 53 is coupled to the protection portion 44, 45 so that the terminal protection member 50 is mounted on the main circuit unit cover 40.

The terminal protection member 50 is detachably mounted on the protection portion 44, 45 of the main circuit unit cover 40. The first end portion 51 of the terminal protection member 50 is coupled to surround the protection portion 44, 45. At this time, an inner surface of the first end portion 51 is brought into contact with an outer surface of the protection portion 44, 45, and outer surfaces of the mounting plates 53 are brought into contact with an inner surface of the protection portion 44, 45. That is, since the protection portion 44, 45 are coupled in such a way that both surfaces thereof are supported by the surface of the first end portion 51 and the surfaces of the mounting plates 53, a high bonding force is secured. In other words, the protection portion 44, 45 is inserted into a space (groove) defined between the surface of the first end portion 51 and the mounting plates 53. The terminal protection member 50 is inserted while the mounting plates 53 are elastically open. When the mounting protrusions 46 and 47 are inserted into the fitting grooves 54, the mounting plates 53 apply surface pressure to the outer surface of the protection portion 44, 45.

FIG. 11 illustrates an embodiment in which the mounting plates 53 are disposed only on the upper and lower surface portions of the first end portion 51, but in another embodiment, the mounting plates 53 may be disposed on left and right surface portions of the first end portion 51 or on all of upper, lower, left and right surface portions. Of course, in this case, the mounting protrusions 46 and 47 of the protection portions 44 and 45 may be formed on the left and right surface portions or to upper, lower, left and right surface portions of the protection portions 44 and 45 to correspond to the mounting plates 53.

Figure 12:
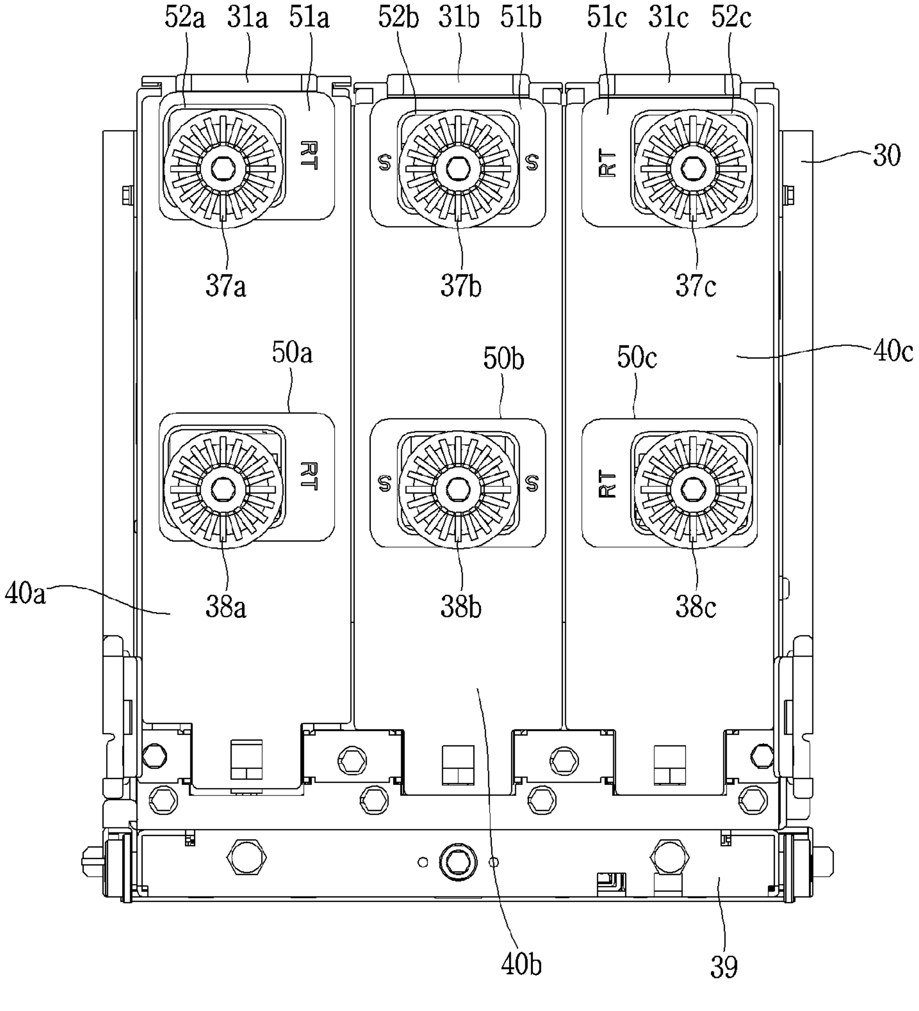
FIG. 12 is a rear view illustrating a circuit breaker in accordance with one embodiment of the present disclosure.

Referring to FIG. 12, a rear view of the circuit breaker 30 is illustrated.

The main circuit unit cover 40 is formed identically for each phase, but the terminal protection member 50 may be formed differently for each phase.

For example, the first-phase terminal protection member 50*a* is formed to be different from the second-phase terminal protection member 50*b*, and to be the same as the third-phase terminal protection member 50*c*.

When viewed from the top, the second-phase terminal protection member 50*b* is formed symmetrically up and down and left and right.

When viewed from the top, the first-phase terminal protection member 50*a* and the third-phase terminal protection member 50*c* are symmetrical with each other up and down but asymmetrical with each other left and right. That is, the second end portions 52*a* and 52*c* of the terminal protection members 50*a* and 50*c* are biased to one side on the left and right. The first-phase terminal protection member 50*a* and the third-phase terminal protection member 50*c* may be configured by using substantially the same component. In this case, the first-phase terminal protection member 50*a* and the second-phase terminal protection member 50*b* are disposed in opposite directions to each other.

In FIG. 12, the first-phase terminal protection member 50*a* and the third-phase terminal protection member 50*c* are disposed such that the second end portions are located far from each other. In this case, a phase-to-phase distance between the main circuit unit terminal 35 and the bus bar connected thereto may be maximized.

Although not separately illustrated, on the contrary, if the second end portions of the first-phase terminal protection member 50*a* and the third-phase terminal protection member 50*c* are symmetrically arranged to be located close to each other, the phase-to-phase distance between the main circuit unit terminal 35 and the bus bar may be minimized.

In the circuit breaker according to one embodiment of the present disclosure, the terminal protection member is separately provided to be detachably coupled to the main circuit unit cover, which can facilitate an assembly process.

Compatibility according to a change in rated voltage can also be enhanced.

In addition, a manufacturing cost can be reduced.

While the invention has been shown and described with reference to the foregoing preferred embodiments thereof, it will be understood by those skilled in the art that various changes and modifications may be made without departing from the scope of the invention as defined by the appended claims. Therefore, the embodiments disclosed in the present disclosure are not intended to limit the scope of the present disclosure but are merely illustrative, and it should be understood that the scope of the technical idea of the present disclosure is not limited by those embodiments. That is, the scope of protection of the present disclosure should be construed according to the appended claims, and all technical ideas within the scope of equivalents thereof should be construed as being included in the scope of the present disclosure.

The invention claimed is:

1. A circuit breaker comprising:

a main circuit unit connected to a power source and a load, respectively;

a main circuit unit cover insulatively covering a rear surface of the main circuit unit;

a main circuit unit terminal connected to the main circuit unit and exposed to outside through the main circuit unit cover; and a terminal protection member detachably coupled to the main circuit unit cover and insulatively covering the main circuit unit terminal, wherein:

the main circuit unit cover is provided with a through hole through which the main circuit unit terminal is inserted, the main circuit unit cover is provided with a protection portion formed in a tubular shape around the through hole, and the terminal protection member is formed in a tubular shape with two steps including a first end portion and a second end portion stepped from each other.

2. The circuit breaker of claim 1, wherein the second end portion is asymmetrically disposed with respect to the first end portion.

3. The circuit breaker of claim 1, wherein the through hole is formed in a circular or polygonal shape, and the protection portion is formed in a shape of a circular tube or polygonal tube corresponding to a shape of the through hole.

4. The circuit breaker of claim 1, wherein the protection portion is provided with a plurality of mounting protrusions or mounting grooves.

5. The circuit breaker of claim 1, wherein the terminal protection member is formed such that a width of the second end portion is smaller than a width of the first end portion and a circumference of the second end portion is smaller than a circumference of the first end portion.

6. The circuit breaker of claim 5, wherein a length of the second end portion is longer than a length of the first end portion.

7. The circuit breaker of claim 5, wherein a plurality of mounting plates coupled to the protection portion are disposed inside the first end portion.

8. The circuit breaker of claim 7, wherein each mounting plate of the plurality of mounting plates is provided with fitting grooves or fitting protrusions coupled to the plurality of mounting protrusions or mounting grooves.

9. The circuit breaker of claim 7, wherein each mounting plate of the plurality of mounting plates is fixed only on a fixed end portion thereof, which comes in contact with a connection surface connecting the first end portion and the second end portion.

10. The circuit breaker of claim 7, wherein the protection portion is inserted into a space defined between a surface of the first end portion and surfaces of the plurality of mounting plates.

11. A circuit breaker comprising:

a main circuit unit cover insulatively covering a rear surface of a main circuit unit;

a main circuit unit terminal connected to the main circuit unit and exposed to outside through the main circuit unit cover, wherein the main circuit unit cover is provided with a through hole through which the main circuit unit terminal is inserted, and wherein the main circuit unit cover is provided with a protection portion formed in a tubular shape around the through hole;

a terminal protection member formed in a tubular shape with two steps including a first end portion and a second end portion stepped from each other is detachably coupled to the main circuit unit cover and insulatively covering the main circuit unit terminal; and a plurality of mounting plates coupled to the protection portion are disposed inside the first end portion of the terminal protection member.

* * * * *